United States Patent
Yang et al.

(10) Patent No.: US 7,822,142 B2
(45) Date of Patent: Oct. 26, 2010

(54) METHOD AND DEVICE FOR CANCELLING INTERFERENCE IN WIRELESS COMMUNICATION SYSTEM

(75) Inventors: Hongwei Yang, Shanghai (CN); Xiaolong Zhu, Shanghai (CN)

(73) Assignee: Alcatel Lucent, Paris (FR)

( * ) Notice: Subject to any disclaimer, the term of this patent is extended or adjusted under 35 U.S.C. 154(b) by 820 days.

(21) Appl. No.: 11/616,984

(22) Filed: Dec. 28, 2006

(65) Prior Publication Data

US 2007/0153935 A1    Jul. 5, 2007

(30) Foreign Application Priority Data

Dec. 29, 2005   (CN) .......................... 2005 1 0112311

(51) Int. Cl.
*H04L 1/02* (2006.01)
*H04L 27/00* (2006.01)

(52) U.S. Cl. ...................................... 375/267; 375/347

(58) Field of Classification Search ............... 375/260, 375/267, 295, 299, 316, 340, 346–347; 370/331, 370/334
See application file for complete search history.

(56) References Cited

U.S. PATENT DOCUMENTS

| 6,937,592 | B1 * | 8/2005 | Heath et al. ................. | 370/342 |
| 6,985,434 | B2 * | 1/2006 | Wu et al. ..................... | 370/208 |
| 7,366,247 | B2 * | 4/2008 | Kim et al. .................... | 375/267 |
| 2005/0281189 | A1 * | 12/2005 | Lee et al. ..................... | 370/208 |

FOREIGN PATENT DOCUMENTS

| WO | WO 01/95531 A2 | 12/2001 |
| WO | WO 2004/038985 A2 | 5/2004 |
| WO | WO 2005/112318 A2 | 11/2005 |

OTHER PUBLICATIONS

Martin Dottling: "Assessment of Advanced Beamforming and MIMO Technologies" IST-2003-507581 Winner D2.7 VER 1.0, Feb. 28, 2005, p. 1, 16-42, XP002430619.

(Continued)

*Primary Examiner*—Khanh C Tran
(74) *Attorney, Agent, or Firm*—Fay Sharpe LLP

(57) ABSTRACT

The present invention provides a transmitter having multiple transmitting antennas, comprising: SM/STC apparatus for performing spatial multiplexing or space-time coding diversity on data and for causing resulting signals to be transmitted parallel by multiple transmitting antennas; and a controller for controlling the SM/STC apparatus to operate in SM mode or STC diversity mode in accordance with a signal indicating the operating area which a receiver is located in. The present invention further a corresponding receiver, a base station device and user equipment each comprising the transmitter and receiver of the present invention, and a corresponding method of interference cancellation. The present invention can obtain both diversity gain and interference cancellation gain by performing interference cancellation at the receiver side when interference from other transmitters dominates in the channel. Therefore, the present invention can improve the system capacity and coverage without increasing the base station complexity or decreasing the spectrum usage efficiency at the cell edge.

12 Claims, 5 Drawing Sheets

OTHER PUBLICATIONS

Multi-cell Simulation Results for Interference Co-ordination in new OFDM DL, Alcatel 3GPP TSG-RAN-1 Ad Hoc on LTE, Sophia Antipolis, France Jun. 20-21, 2005, 10 pages.

Atarashi et al., Broadband Packet Wireless Access Based on VSF-OFCDM and MC/DS-CDMA, IEICE Trans. Commun, vol. 86, pp. 291-299 (2002).

IEEE Std. 802.16, Part 16: Air Interface for Fixed and Mobile Broadband Wireless Access Systems, Amendment 2 and Corrigendum 1, IEEE Computer Society and the IEEE Microwave Theory and Techniques Society including front matter (pp. i-xxvi), Section 6.3.22.3 (pp. 250-259); Section 8.4.8 (pp. 570-615); Feb. 28, 2006.

* cited by examiner

METHOD AND DEVICE FOR CANCELLING INTERFERENCE IN WIRELESS COMMUNICATION SYSTEM

CROSS-REFERENCE TO RELATED APPLICATION(S)

This application is based on the Chinese Patent Application No. 200510112311.8 filed on Dec. 29, 2005, the disclosure of which is hereby incorporated by reference.

FIELD OF THE INVENTION

The present invention generally relates to the interference cancellation technique in a wireless communication system and, more particularly, to a multiple-input multiple-output (MIMO) based interference cancellation method in a cellular wireless communication system and corresponding devices.

BACKGROUND OF THE INVENTION

In a wireless communication system, both sides of transmitter and receiver can use a plurality of antennas for communication transmission, namely the multiple-input multiple-output (MIMO) technique. If channels between respective transmit and receiving antennas are independent of each other, then a plurality of parallel spatial channels can be created in a communication system using the MIMO technique. And a wireless communication system, especially a cellular wireless communication system, can be enhanced in terms of capacity and coverage by independently transmitting information via these parallel spatial channels. However, for the cellular wireless system with small frequency reuse factor, especially for frequency reuse factor of 1, benefits of capacity gain or diversity gain from MIMO will be degenerated significantly due to relatively low signal to interference plus noise power ratio (SINR) at the cell edge. As a matter of fact, noise and multi-path fading are dominant factors behind wireless channel distortion in the cell center, and serious inter-cell interference (ICI) is the dominant factor in affecting channels at the cell edge where SINR is usually less than 0 dB.

The inter-cell interference cancellation methods that have been disclosed till now include a repetition code method proposed by Hiroyuki Atarashi on "Broadband packet wireless access based on VSF-OFCDM and MC-DS-CDMA" Proceedings of PIMRC 2002, a dynamical scheduling method proposed by ALCATEL on 3GPP R1-050594, "Multi-cell Simulation Results for Interference Coordination in new OFDM DL," and a MIMO based macro diversity method proposed on IEEE 802.16e/D9 in July 2005. The repetition code method ensures a wireless communication system using MIMO to operate in the range of low SINR by achieving code gain, which is at the cost of bandwidth efficiency. The dynamical scheduling method coordinates ICI by allocating orthogonal channel resource (frequency bands for an OFDM system) to the users at the cell edge, thereby avoiding interference to the users in neighboring cells. However, it results in complex coordination operations among related transmitters and low channel usage efficiency at the cell edge. This method is also at the cost of channel usage efficiency and base station complexity. The MIMO based macro diversity method transmits the same data streams jointly from a plurality of relevant transmitters at the cell edge, and hence it avoids ICI and achieves diversity. However, just like the dynamic scheduling method, it causes problems, such as low channel usage efficiency and base station complexity.

To sum up, existing interference cancellation methods for wireless communication systems cannot effectively avoid ICI without increasing base station (transmitter) complexity and/or decreasing low spectrum usage efficiency.

SUMMARY OF THE INVENTION

In order to overcome the deficiencies in the prior art, the present invention provides an interference cancellation method in a wireless communication system and a corresponding device, especially as an effective solution for cellular capacity and coverage enhancement for a MIMO based cellular wireless communication system.

In accordance with one aspect of the present invention, provided is a transmitter having multiple transmitting antennas, comprising: SM/STC apparatus for performing spatial multiplexing or space-time coding on data and for causing resulting signals to be transmitted parallel by multiple transmitting antennas; and a controller for controlling the SM/STC apparatus to operate in SM mode or STC diversity mode in accordance with a received signal indicating the operating area which a receiver is located in.

According another aspect of the present invention, provided is a receiver having multiple receiving antennas, comprising: SM direction section for demultiplexing signals received by multiple receiving antennas; interference cancellation section for processing interference cancellation on signals received by multiple receiving antennas; first switch means for, according to a control signal, switching signals received by multiple receiving antennas from the branch which the SM detection section is located in to the branch which the interference cancellation section is located in, or from the branch which the interference cancellation section is located in to the branch which the SM detection section is located in; an estimator for performing channel estimation in accordance with signals received by multiple receiving antennas and for estimating the current interference level of the receiver; and decision means for, according to the interference level, deciding whether the receiver is located in the SM area or in the IC area, for conveying the decision result to the corresponding transmitter and for notifying the first switch means of the decision result as a control signal, wherein when the receiver is located in the SM area, signals received by multiple receiving antennas are processed over the branch which the SM detection section is located in, and when the receiver is located in the IC area, signals received by multiple receiving antennas are processed over the branch which the interference cancellation section is located in.

According to another aspect of the present invention, provided are a base station device comprising the transmitter and receiver according to the present invention, and user equipment comprising the transmitter and receiver according to the present invention.

According to another aspect of the present invention, provided is an interference cancellation method in a wireless communication system, comprising the steps of: according to the current interference level of a receiver, determining whether the receiver currently operates in the SM area or the IC area; if the receiver currently operates in the SM area, a transmitter and the receiver of the wireless communication system operating in SM mode; if the receiver currently operates in the IC area, the transmitter operating in STC diversity mode and the receiver operating in IC mode.

With the present invention, the wireless communication system can obtain capacity gain by using multiple transmit and receiving antennas for data spatial multiplexing when noise and fading dominates in the channel, and when interference from other transmitters dominates in the channel, the wireless communication system can obtain both diversity gain and interference cancellation gain by using multiple receiving antennas for interference cancellation at the receiver, thereby achieving potential capacity gain. In a word, the present invention can improve the system capacity and coverage. Compared with the existing inter-cell interference cancellation methods, the present invention will not increase the base station complexity or decrease the spectrum usage efficiency at the cell edge. Additionally, the present invention can be used in conjunction with other inter-cell interference cancellation techniques, such as repetition code, to extend the system coverage further. Moreover, the present invention can be used to improve the transmission performance of both downlink and uplink in a cellular wireless communication network.

Other features and advantages of the present invention will become more apparent from the detailed description of embodiment of the present invention, when taken in conjunction with the accompanying drawings.

BRIEF DESCRIPTION ON THE DRAWINGS

DESCRIPTION OF THE PREFERRED EMBODIMENTS

Referring to the accompanying drawings, embodiments of the present invention will be described in detail below.

Figure 1:
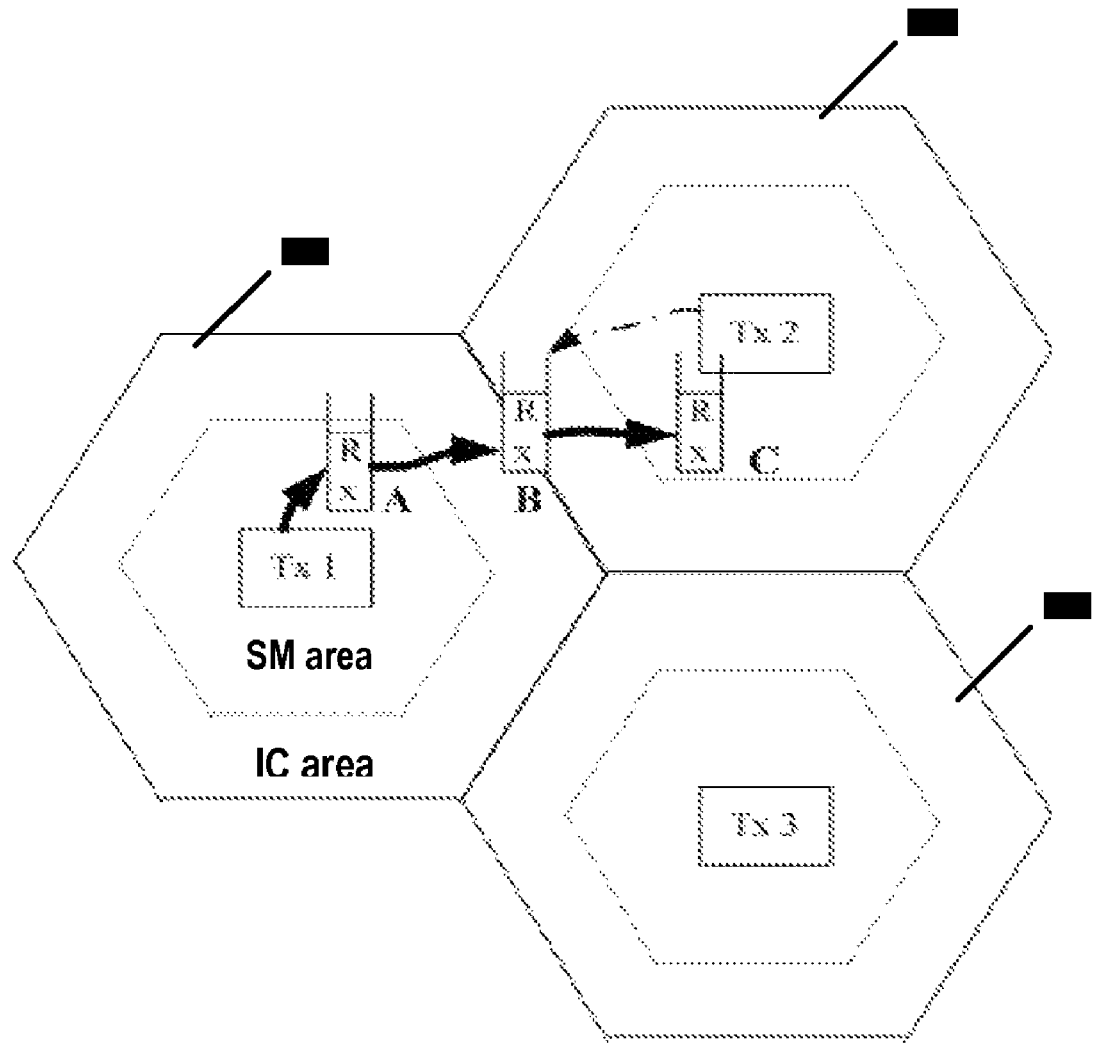
FIG. 1 depicts a schematic view of a wireless communication system according to an embodiment of the present invention.

FIG. 1 depicts a schematic view of a wireless communication system according to an embodiment of the present invention. The cellular wireless communication system as depicted in FIG. 1 shows, by way of example, three neighboring cells numbered 101, 102 and 103, respectively. Tx 1, Tx 2 and Tx 3 are corresponding transmitters in these three cells (e.g. base station of cell), and all the transmitters operate on the same radio frequency. Rx is a mobile receiver (e.g. a user equipment such as a mobile station), which is in wireless communication with the transmitters.

According to the embodiment of the present invention, each of cells 101, 102 and 103 is divided into two areas based on the inter-cell interference (ICI) level (in FIG. 1, cell 101 is taken for an example). The area inside the cell center is called the spatial multiplexing (SM) area, and the area located in the cell edge the interference cancellation (IC) area. When Rx is located in the SM area, such as at the point of A, the signal to interference plus noise power ratio (SINR) is relatively high since noise and fading are dominant factors of channels, and TX 1 may use multiple transmitting antennas to implement SM for the purpose of capacity enhancement due to relatively high SINR. In this case, multiple antennas at Rx are used to separate multiple data symbols parallel transmitted by the multiple antennas at Tx 1 (the number of receiving antennas used should not be less than that of data streams parallel transmitted). When Rx is located in the IC area, such as at the point of B, interferences from neighboring cell transmitters are dominant factors of channels, and diversity gain is achieved by transmitting diversity between Tx 1 and Rx, instead of SM. In this case, multiple antennas at Rx are used for interference cancellation from neighboring cells.

The area the receiver is currently located in can be determined by monitoring the ICI level, and it can also be determined whether the system should currently perform SM or interference cancellation. Typically, but not limited to this, such monitoring can be performed by checking parameters familiar to those skilled in the art, such as SINR, SIR and CIR (in CDMA systems).

In an embodiment of the present invention, as the receiver moves from the SM area of the cell center (e.g. the position of A) to the IC area of the cell edge (e.g. the position of B), SIR measured at the receiver is lower than a predetermined threshold, which indicates whether the receiver has entered the IC area. At this moment, the transmitter Tx 1 will receive from the receiver Rx a signal indicating that the receiver has entered the IC area, and then the transmitter Tx 1 switches to STC diversity mode from SM mode. Correspondingly, the receiver switches from SM detection mode to IC mode. In the IC area, system coverage is more important than throughput since the supportable data rate is usually low in this area. In case that space-time transmitting diversity scheme is used, the receiver Rx side does not need more than two receiving antennas to perform decoding, and the rest of antennas can be used for interference cancellation. Once the receiver Rx reenters the SM area of the cell center (e.g. the position of C in FIG. 1), similar to the above switching procedure, the system can automatically switch to high throughput mode of SM by checking the parameter SIR.

Comparatively speaking, it is much more effective in terms of system capacity enhancement to keep transmitting antennas for transmission diversity and to use receiving antennas for interference cancellation, rather than to use all transmitting and receiving antennas for spatial diversity. For a system with a single transmitting antenna, if at the receiver side is equipped with N antennas, theoretically as many as N−1 interference sources can be cancelled. For a space-time coded system with two antennas, if the receiver is equiped with N antennas, theoretically as many as N−2 interference sources can be cancelled, because signals from transmitters of neighboring cells are also space-time coded. A single transmitter of neighboring cells reaches two interferences at the same time, i.e. two space-time coded symbols. For a system using diversity against multi-path fading, the system performance can be improved greatly simply by cancelling a most significant interference source. Therefore, those skilled in the art can understand that the cellular system performance where interference sources mainly derive from transmitters (e.g. base stations) of neighboring cells will be improved significantly by using the method and corresponding devices of the present invention.

It should be noted that the present invention can further be applied in a base station in order to cancel uplink interference from mobile stations of neighboring cells. At this moment, the base station, as a receiver, has multiple receiving antennas, and each of the mobile stations, as a transmitters, has multiple transmitting antennas. Correspondingly, according to the IC level, the cell can also be divided into the SM area and the IC area. Therefore, the specific example at the transmitter side and the receiver side shown in FIG. 1 does not constitute limitations on the present invention.

Figure 2:
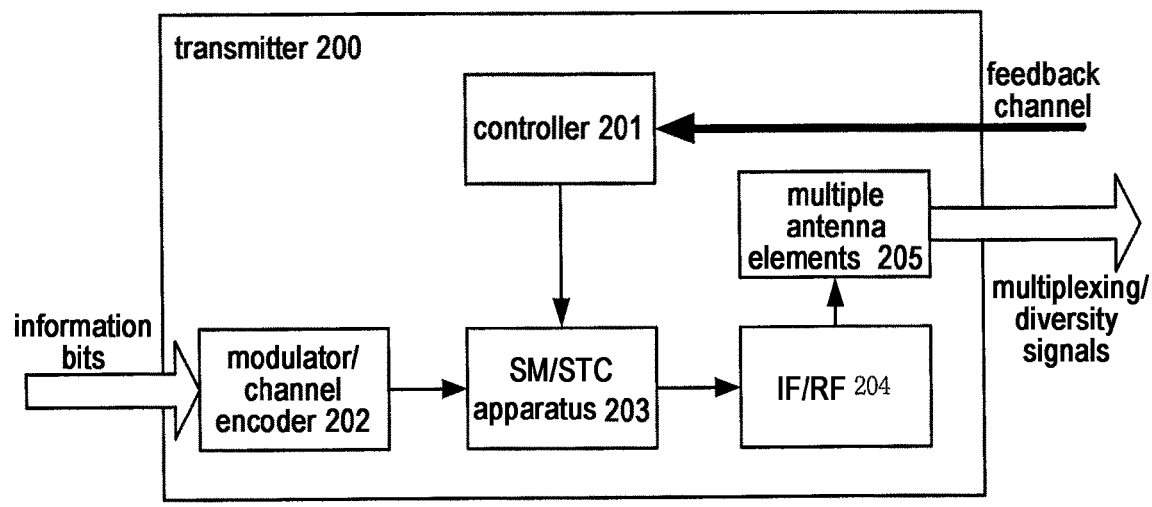
FIG. 2 depicts a functional block diagram of a transmitter according to an embodiment of the present invention.

FIG. 2 depicts a functional block diagram of a transmitter according to an embodiment of the present invention. In the figure, numeral 200 denotes a transmitter according to an embodiment of the present invention, 201 denotes a controller at least for controlling the transmitter to switch between SM mode and STC diversity mode, 202 schematically denotes a modulator and channel encoder in the transmitter, 203 denotes SM/STC apparatus capable of switching between SM mode and STC diversity mode based on a control signal, 204 denotes an IF/RF module for processing an intermediate frequency (IF)/radio frequency (RF) signal, and 205 denotes multiple antenna elements having multiple transmitting antennas.

As depicted in FIG. 2, just like a conventional wireless transmitter, the modulator and channel encoder 202 performs channel encoding and digital modulation on an information bit(s). At the same time, the controller 201 collects via a feedback channel the controlling bit(s) from the receiver and conveys control signaling to the SM/STC apparatus 203 so as to instruct it to choose SM mode or STC diversity mode. Correspondingly, the SM/STC apparatus 203 multiplexes or encodes the resulting modulation symbols depending on whether the signaling indicates SM mode or STC diversity mode. Finally, the resulting signals are processed by the IF/RF module 204 and then transmitted by the multiple antenna elements 205 via radio channels.

Transmitter 200 switches its operating mode according to the information coming from the feedback channel. The feedback channel can be implemented in any form well known to those skilled in the art. In an embodiment, the feedback channel is implemented as a 1-bit feedback channel. Table 1 lists the values of the feedback bit and areas they indicate correspondingly.

TABLE 1

Configuration of feedback bit

| Feedback Bit | Operation area indication | Descriptions |
| --- | --- | --- |
| 0 | IC area | Receiver performs ICI cancellation by using multiple antennas |
| 1 | SM area | Receiver performs SM by using multiple antennas |

Figure 3:
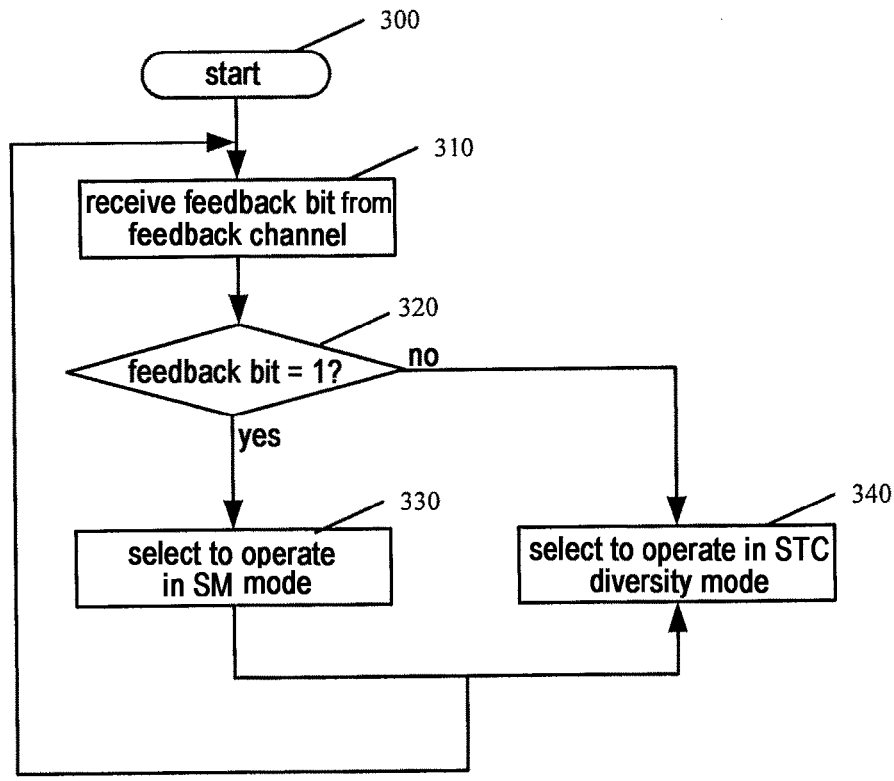
FIG. 3 depicts a flowchart of the operation of the transmitter according to an embodiment of the present invention.

FIG. 3 depicts a flowchart of the operation of the transmitter according to an embodiment of the present invention.

As depicted in FIG. 3, the transmitter starts the processing flow in step 300.

In step 310, the controller in the transmitter receives a feedback bit via a feedback channel.

In step 320, the controller judges whether the feedback bit is 1. If the judgment result is "yes", then the process proceeds to step 330; if the judgment result is "no", then the process proceeds to step 340.

In step 330, the controller controls the SM/STC apparatus to operate in SM mode.

In step 340, the controller controls the SM/STC apparatus to operate in STC diversity mode.

Upon completion of step 330 or 340, the process returns to step 310 to repeat the above steps.

Figure 4:
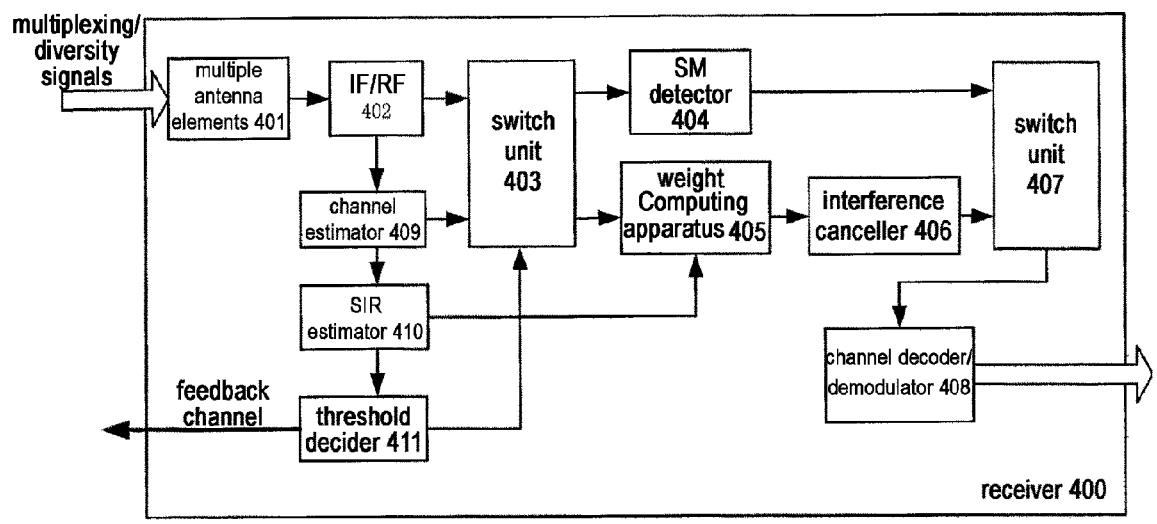
FIG. 4 depicts a functional block diagram of a receiver according to an embodiment of the present invention.

FIG. 4 depicts a functional block diagram of a receiver according to an embodiment of the present invention. In the figure, numeral 400 denotes a receiver according to an embodiment of the present invention, 401 denotes multiple antenna elements for receiving multiplexing/diversity signals, 402 denotes an IF/RF module for performing IF/RF processing on signals, 403 and 407 each denote a switch unit for switching signals, 404 denotes a spatial multiplexing detector for processing spatial multiplexing signals, 405 denotes a weight computing apparatus for computing weights for cancelling inter-cell interference, 406 denotes an interference canceller, 408 denotes a channel decoder/demodulator for performing channel decoding and demodulation on signals, 409 denotes a channel estimator for estimating a current channel, 410 denotes a SIR estimator for estimating SIR of a received signal, and 411 denotes a threshold decider for deciding current SIR in order to generate a feedback signal.

As depicted in FIG. 4, signals received via the multiple antenna elements 401 at the receiver 400 are converted to baseband signals by the IF/RF module 402, and then data symbols and pilot symbols are respectively extracted therefrom. Using the pilot symbols, the channel estimator 409 estimates the current channel matrixes which are used not only for subsequent SM or IC but also for SIR measurement performed by the SIR estimator 410; on the other hand, the channel estimator 409 estimates, for subsequent IC, covariance matrixes of interference from neighboring cells and received channel noise. According to the estimated interference level (reflected by the estimation parameter SIR in this embodiment), the threshold decider 411 determines whether the receiver 400 is located in the SM area or the IC area, and conveys the decision result to the switch unit 403. If the decision result is that the receiver 400 is located in the SM area, then the switch unit 403 conveys the data symbols, the estimated channel matrixes and the estimated covariance matrixes of interference from neighboring cells and noise to the SM detector 404 for corresponding processing. If the decision result is that the receiver 400 is located in the IC area, then the switch unit 403 conveys the data symbols, the estimated channel matrixes and the estimated covariance matrixes of interference from neighboring cells and noise to the branch formed by the weight computing apparatus 405 and the interference canceller 406, which in turn cancel interference from signals. Then, the resulting signals are inputted via the switch unit 407 to the channel decoder/demodulator 408. After a series of conventional processing, such as decoding and demodulation, the desired signals are obtained finally.

According to the present invention, the SIR estimator 410 may be implemented in any form known to those skilled in the art. For example, consider an uplink exemplary scenario, which is different to that depicted in FIG. 1. In this scenario, there are M number of mobile stations including one served mobile station and M−1 interference mobile stations (located in other cells). Each mobile station as a transmitter has two transmitting antennas and the base station as a receiver has N number of receiving antennas. Those skilled in the art can understand that the scenario in which the mobile station has more than two antennas is similar to the current exemplary scenario. For example, two antennas can be selected from multiple antennas for parallel transmission by using the antenna selecting technique. The channel matrix from the served mobile station to the base station is modeled as $$H^{(1)} = \begin{bmatrix} h_{1,1}^{(1)} & h_{1,1}^{(1)} & \cdots & h_{1,1}^{(1)} \\ h_{1,1}^{(1)} & h_{1,1}^{(1)} & \cdots & h_{1,1}^{(1)} \end{bmatrix}^T \qquad \text{(Equation 1)}$$

where $h_{i,j}^{(1)}$ denotes the channel state information of the wireless MIMO channel between the ith antenna at mobile station and the jth antenna at base station.

In this example, both the served mobile station and the interference mobile stations are assumed to use an Alamouti STBC, which encodes the transmitted symbols $s_1^{(m)}$ and $s_2^{(m)}$ during two symbol intervals over two antennas. The Alamouti codeword is represented as:

$$S^{(m)} = \begin{bmatrix} s_1^{(m)} & -(s_2^{(m)})^* \\ s_2^{(m)} & (s_1^{(m)})^* \end{bmatrix} \quad \text{(Equation 2)}$$

The Alamouti code has property as $$E[S^{(m)}(S^{(m)})^*] = 2E_s I_2 \quad \text{(Equation 3)}$$

where $E_s$ is the symbol energy, and $I_2$ represents a 2-by-2 dimensional identity matrix, and $E(\bullet)$ is the expectation value operator. The noise sample collected at those N receiving antennas at the base station during two symbols intervals are represented with an N-by-2 dimensional matrix N with each entry being zero-mean complex Gaussian variable with variance $\sigma^2$. The total transmitted signal power at each mobile station is fixed at value $2E_s$. The SNR is defined as $2E_s/\sigma^2$. Signal samples on those N receiving antennas at the base station over two symbol intervals are expressed with an N-by-2 dimensional matrix:

$$X = \underbrace{H^{(1)}S^{(1)}}_{\text{desired signals}} + \underbrace{\sum_{m=2}^{M} H^{(m)}S^{(m)} + N}_{\text{interference signals}} \quad \text{(Equation 4)}$$

Then, the signal correlation matrix and the interference plus noise correlation matrix are expressed as:

$$R_s = E[H^{(1)}S^{(1)}(H^{(1)}S^{(1)})^H] = 2E_s H^{(1)}(H^{(1)})^H \quad \text{(Equation 5)}$$

and $$R_{ni} = E\left[\sum_{m=1}^{M} H^{(m)}S^{(m)}(H^{(m)}S^{(m)})^H\right] \quad \text{(Equation 6)}$$

$$= 2E_s \sum_{m=1}^{M} H^{(m)}(H^{(m)})^H + 2\sigma^2 I_N$$

Then, the SIR is defined as $$SIR = \frac{\text{trace}(R_s)}{\text{trace}(R_{ni})} \quad \text{(Equation 7)}$$

According to the following expression:

$$\underbrace{\sum_{m=2}^{M} H^{(m)}S^{(m)} + N}_{\text{interference signals}} = X - \underbrace{H^{(1)}S^{(1)}}_{\text{desired signals}} \quad \text{(Equation 8)}$$

$R_{ni}$ can be estimated through training sequence as $$R_{ni} = E\left[\left(X - \underbrace{H^{(1)}S^{(1)}}_{\text{desired signals}}\right)\left(X - \underbrace{H^{(1)}S^{(1)}}_{\text{desired signals}}\right)^H\right] \quad \text{(Equation 9)}$$

And $R_s$ can be estimated according to Equation 5, where $H^{(1)}$ is obtained at the base station via the channel estimator 409.

According to the present invention, upon receipt of the SIR estimated by the SIR estimator 410, the threshold decider 411 compares the estimated SIR with the predetermined SIR threshold. If the estimated SIR is larger than the predetermined SIR threshold, then the threshold decider 411 decides that the receiver is located in the IC area. If the estimated SIR is not larger than the predetermined SIR threshold, the threshold decider 411 decides that the receiver is located in the SM area. The predetermined SIR threshold depends on specific propagation environments where the system is in, and the specific design of the transmitter and receiver. Those skilled in the art can define the threshold prior to the arrival of signals based on the criteria to maximize the system capacity.

According to the present invention, the weight computing apparatus 405 and the interference canceller 406 may be implemented in any form known to those skilled in the art. In an embodiment, the interference canceller 406 uses pre-combining algorithms. The received signals from each of the antennas are combined by being multiplied with a weight. The weight computing apparatus 405 computes weight vector as $$w = [w_1 \ldots w_M]^T \quad \text{(Equation 10)}$$

Then, the optimal weight vector w is chosen as the eigenvector corresponding to the maximum eigenvalue of $R_{ni}^{-1}R_s$. In the presence of the beamforming, an equivalent 1-by-2 dimensional vector channel is formed at the base station for the served mobile station as:

$$g^{(1)} = [g^{(1)} g^{(2)}] = (w)^H H^{(1)} \quad \text{(Equation 11)}$$

Exploiting the algebraic structure of the Alamouti STBC codeword, the virtual MIMO channel over two symbols is constructed as $$G^{(1)} = \begin{bmatrix} g_1^{(1)} & -(g_2^{(1)})^* \\ g_2^{(1)} & (g_1^{(1)})^* \end{bmatrix} \quad \text{(Equation 12)}$$

Then, the following linear processing process produces the Maximum Likely-hood decoding $\hat{s}_1^{(1)}$ and $\hat{s}_2^{(1)}$ of symbols $s_1^{(1)}$ and $s_2^{(1)}$:

$$\begin{bmatrix} \hat{s}_1^{(1)} \\ \hat{s}_2^{(1)} \end{bmatrix} = (G)^{-1} \begin{bmatrix} y_1 \\ y_2^* \end{bmatrix} \quad \text{(Equation 13)}$$

where Y is a 2-by-1 dimensional signal vector output after pre-combining for the served mobile station as:

$$y = [y_1 y_2]^T = (w)^H X \quad \text{(Equation 14)}$$

Figure 5:
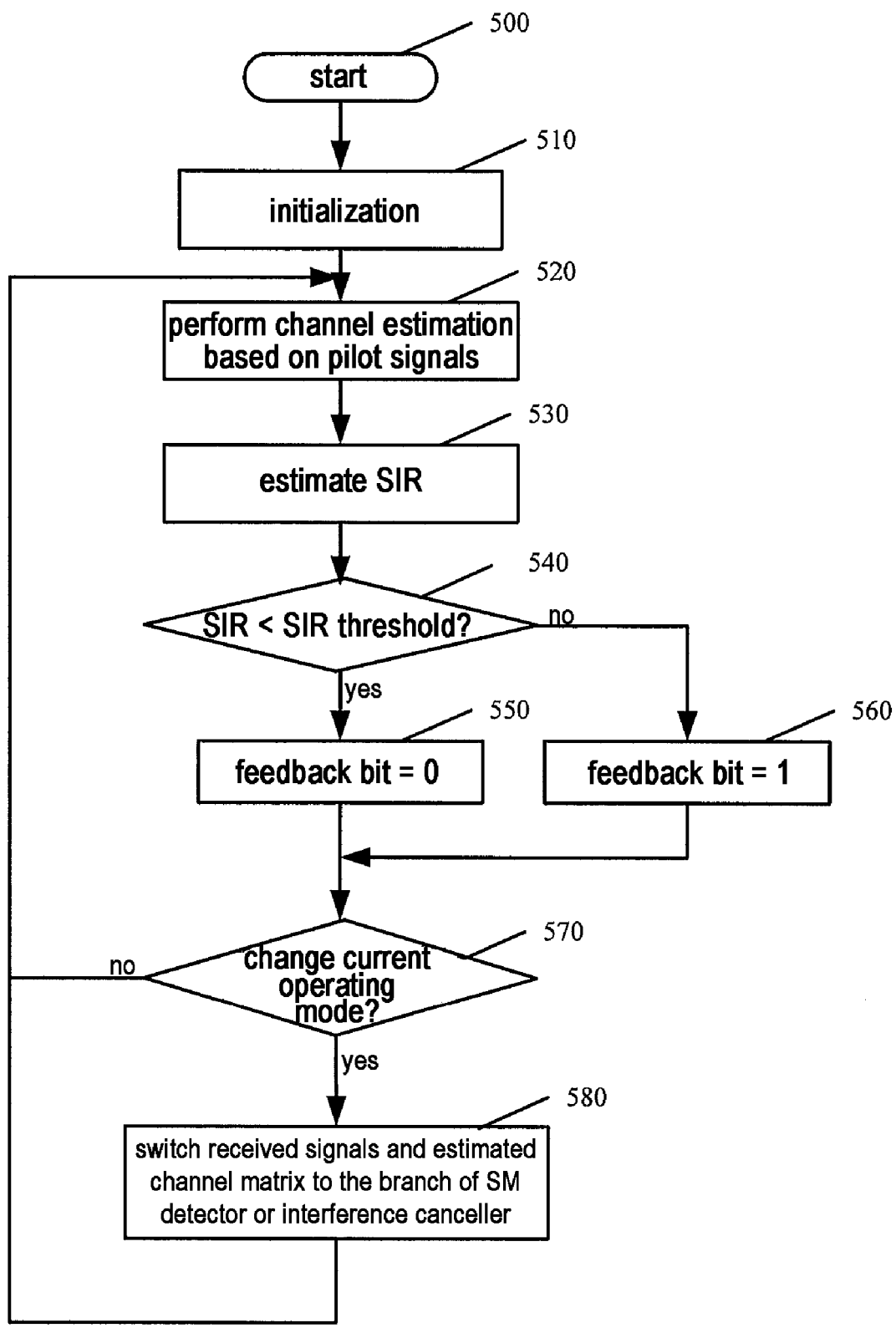
FIG. 5 depicts a flowchart of the operation of the receiver according to an embodiment of the present invention.

FIG. 5 depicts an flowchart of the operation of the receiver according to an embodiment of the present invention.

As depicted in FIG. 5, the receiver starts the process in step 500.

Initialization is performed in step 510. For example, in this step, the receiver first estimates the currently received SIR, then decides its operating area, and notifies the transmitter of the decided result via the feedback channel so that the transmitter can decide its initial operating mode.

In step 520, after the communication is started, channel estimation is performed based on the received pilot symbols, so as to obtain the current channel matrix. At the same time, parameters needed for subsequent processing are estimated, such as the covariance matrix of the received interference plus noise, which might be needed during computation of weights for interference cancellation.

In step 530, the current SIR is estimated.

In step 540, whether the resulting SIR is less than the predetermined SIR threshold is decided.

If the decision result in step 540 is "yes," then the process proceeds to step 550, in which the feedback bit is then set as "0."

If the decision result in step 540 is "no," then the process proceeds to step 560, in which the feedback bit is then set as "1".

In step 570, whether the current operating mode needs to be changed is decided. The decision may be implemented in various ways. For example, the current feedback bit can be stored, and the newly obtained feedback bit is compared with the stored current feedback bit. If they are equal to each other, then it indicates that the operating mode does not need to be changed. If not, then it indicates that the operating mode needs to be changed.

If the decision result in step 570 is "no," then the process returns to step 520 to repeat the previous steps.

If the decision result in step 570 is "yes," then the process proceeds to step 580. In step 580, based on the newly determined operating area, the received signals and the estimated channel matrix are switched to the branch of the SM detector or of the interference canceller.

Afterwards, the process returns to step 520 to repeat the previous steps.

Figure 6:
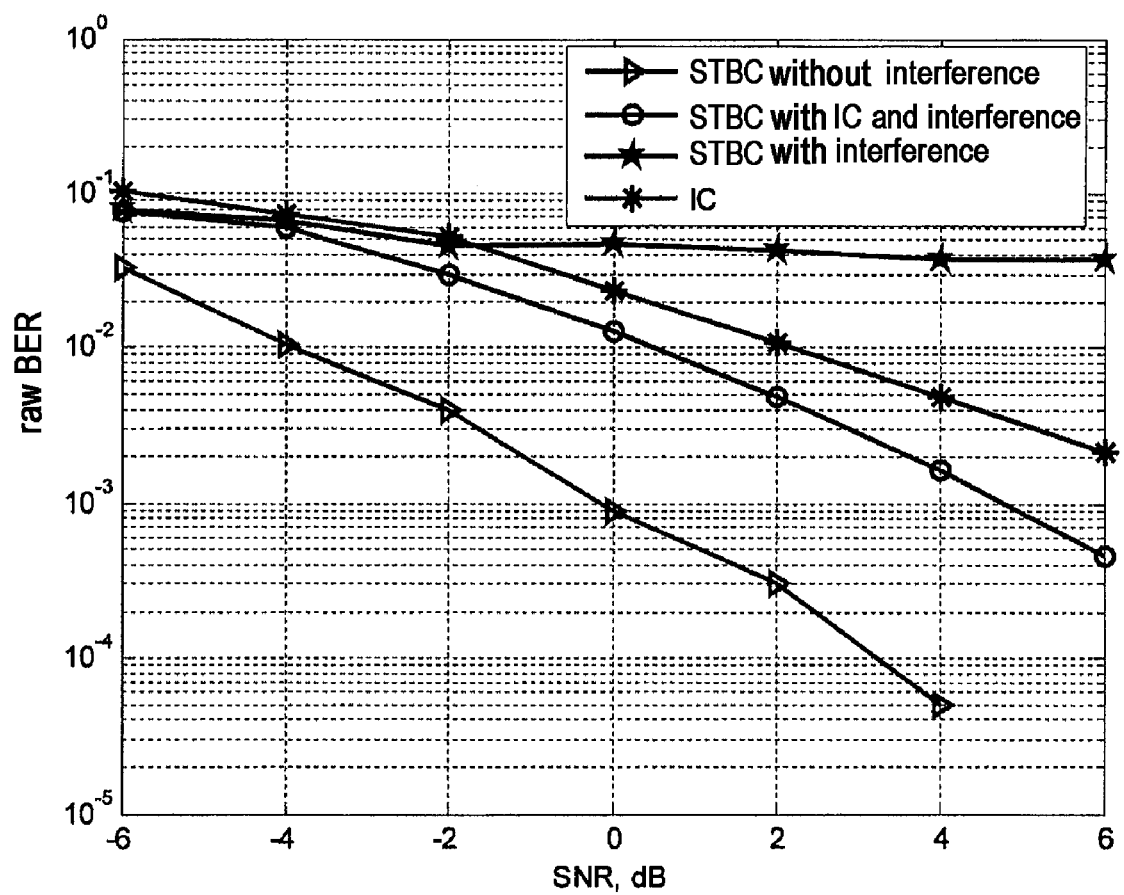
FIG. 6 depicts results from performance simulation according to an embodiment of the present invention.

FIG. 6 depicts results from performance simulation according to an embodiment of the present invention. Main parameters used in simulation are as shown in Table 2.

TABLE 2

| Simulation parameters | | | |
|---|---|---|---|
| Number of transmitting antennas | 2 | Number of receiving antennas | 4 |
| Modulation | QPSK | Channel coding | No |
| Fading channel | Flat Rayleigh channel | Number of interference | 1 |
| Receiver | IC as in Equation (13) | Channel estimation | Ideal |
| SIR | 0 dB | | |

FIG. 6 depicts raw bit error rate (Raw BER) performance comparisons of various STBS schemes. In the figure, the trigonal curve represents the performance of STBC transmission over fading channel without IC at the receiver side; the circular curve represents the performance of STBC transmission over interference channel of 0 dB SIR with IC at the receiver side; the hexagram curve represents the performance of single antenna transmission over interference channel of 0 dB SIR with IC at the receiver side; and the pentagram curve represents the performance of STBC transmission over interference channel of 0 dB SIR without IC at the receiver side.

In FIG. 6, interference degrades the performance of STBC so significantly that STBC can't obtain any diversity gain when interference dominates, as shown in the comparisons of the trigonal curve and the pentagram curve. The solution with single antenna transmission and IC at the receiver side improves BER performances significantly, as shown in the comparisons of the pentagram curve and the hexagram curve.

Thus, when the mobile station is at the cell edge, it is advantageous to use the interference cancellation method and devices according to the present invention in order to improve uplink performances. And the solution with multiple antennas for interference cancellation can obtain both diversity gain and interference gain, as shown in the comparisons of the hexagram curve and the circular curve.

With the interference cancellation solution of the present invention, when interference is the dominant factor of channels, both spatial diversity gain and interference cancellation gain can be obtained by using multiple transmitting antennas for STC transmission diversity and using multiple receiving antennas for interference cancellation.

It should be understood from the foregoing description that the interference cancellation solution for a wireless communication system according to the present invention is intended to determine the operating mode of MIMO systems according to different interference levels in current communication environments, so as to achieve the object of system performance and coverage enhancement. Although the interference level is reflected by SIR in the previously described embodiments, any other parameter known to those skilled in the art can be used provided it can reflect the interference level, such as CIR in CDMA systems and SINR. Moreover, as previously described in the embodiments, the interference cancellation solution for a wireless communication system according to the present invention can be applied in uplinks and downlinks of a cellular wireless communication system so as to improve transmission performances of both uplinks and downlinks. Therefore, a preferred embodiment is that the transmitter and receiver according to the present invention are included among base station devices and also among user equipment, like a mobile station.

As the embodiments of the present invention have been described with reference to the accompanying drawings, various modifications or alterations can be made by those skilled in the art within the scope of the appended claims.

What is claimed is:

1. A receiver having multiple receiving antennas, comprising:

a spatial multiplexing (SM) detection section for demultiplexing signals received by said multiple receiving antennas;

an interference cancellation (IC) section for performing interference cancellation on signals received by said multiple receiving antennas;

first switch means for, according to a control signal, switching signals received by said multiple receiving antennas from the branch which the SM detection section is located in to the branch which the interference cancellation section is located in, or from the branch which the interference cancellation section is located in to the branch which the SM detection section is located in;

an estimator for performing channel estimation in accordance with the signals received by said multiple receiving antennas and for estimating a current interference level for said receiver; and decision means for, according to said interference level, deciding whether said receiver is located in the SM area or in the IC area, for conveying the decision result to the corresponding transmitter and for notifying said first switch means of the decision result as a control signal, wherein when said receiver is located in the SM area, the signals received by said multiple receiving antennas are processed over the branch which said SM detection section is located in, and when said receiver is located in the IC area, the signals received by said multiple receiving antennas are processed over the branch which said interference cancellation section is located in.

2. The receiver according to claim 1, wherein said decision means determines that said receiver is located in the IC area when said current interference level is larger than a predetermined threshold, and determines that said receiver is located in the SM area when said current interference level is not larger than the predetermined threshold.

3. The receiver according to claim 1, wherein said estimator estimates the interference level by estimating channel quality parameters capable of reflecting the interference level, and said channel quality parameters include SIR, SINR and CIR.

4. The receiver according to claim 1, further comprising: second switch means for conveying an output signal of said SM detection section or an output signal of said interference cancellation section to a subsequent processing section, and wherein said interference cancellation section comprises: a weight computing apparatus for computing weight of each signal for interference cancellation in accordance with the output signal of said estimator and the signals received by said receiving antennas.

5. A base station device, comprising:
a transmitter having multiple transmitting antennas, said transmitter comprising SM/STC apparatus for performing spatial multiplexing or space-time coding diversity on data and for causing resulting signals to be transmitted parallel by said multiple transmitting antennas; and
a controller for controlling said SM/STC apparatus to operate in SM mode or STC diversity mode in accordance with a received signal indicating the operating area which a receiver is located in; and a receiver according to claim 1.

6. User equipment, comprising a transmitter having multiple transmitting antennas, said transmitter comprising:
SM/STC apparatus for performing spatial multiplexing or space-time coding diversity on data and for causing resulting signals to be transmitted parallel by said multiple transmitting antennas; and
a controller for controlling said SM/STC apparatus to operate in SM mode or STC diversity mode in accordance with a received signal indicating the operating area which a receiver is located in; and a receiver according to claim 1.

7. A method of interference cancellation in a wireless communication system, comprising steps of:
at a transmitter, judging whether a receiver currently operates in a spatial multiplexing (SM) area of a cell or an interference cancellation (IC) area of the cell based at least in part on a received signal indicative of the current inter-cell interference level of the receiver in relation to a predetermined threshold;
if said receiver currently operates in said SM area, said transmitter and said receiver of said wireless communication system operating in an SM mode; and
if said receiver currently operates in said IC area, said transmitter operating in a space-time coding (STC) diversity mode and said receiver operating in an IC mode;
wherein the transmitter and receiver use multiple transmitting and receiving antennas for communicating parallel data streams from the transmitter to the receiver during both SM and IC modes;
wherein the transmitter uses multiple transmitting antennas to transmit parallel data streams to the receiver in the IC mode and the receiver uses at least two receiving antennas to receive the parallel data streams from the transmitter and uses other receiving antennas to perform inter-cell interference cancellation.

8. The method according to claim 7, further comprising the steps of:
said receiver estimating the current inter-cell interference level based at least in part on signals received by multiple receiving antennas; and
determining that said receiver is located in the IC area when said current inter-cell interference level is larger than a predetermined threshold, and determining that said receiver is located in the SM area when said current inter-cell interference level is not larger than the predetermined threshold.

9. The method according to claim 7, wherein the inter-cell interference level is estimated by estimating channel quality parameters capable of reflecting the inter-cell interference level, and said channel quality parameters include SIR, SINR and CIR.

10. The method according to claim 7, further comprising the step of:
notifying said transmitter of information indicating whether said receiver is currently located in the SM area or the IC area so that corresponding operating mode can be taken.

11. The method of claim 7 wherein the SM area of the cell comprises a center of the cell and the IC area of the cell comprises an edge of the cell.

12. The method of claim 7 wherein the transmitter uses multiple transmitting antennas to transmit parallel data streams to the receiver in the SM mode and the receiver uses at least the same amount of multiple receiving antennas to receive the parallel data streams from the transmitter.

* * * * *